(12) United States Patent
Lee

(10) Patent No.: US 12,349,204 B2
(45) Date of Patent: Jul. 1, 2025

(54) DEVICE AND METHOD FOR CONTROLLING ACCESS TO CELL

(71) Applicant: SK TELECOM CO., LTD., Seoul (KR)

(72) Inventor: Hyun Yong Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 714 days.

(21) Appl. No.: 17/430,366

(22) PCT Filed: Mar. 3, 2020

(86) PCT No.: PCT/KR2020/003001
§ 371 (c)(1),
(2) Date: Aug. 12, 2021

(87) PCT Pub. No.: WO2020/218732
PCT Pub. Date: Oct. 29, 2020

(65) Prior Publication Data
US 2022/0132592 A1    Apr. 28, 2022

(30) Foreign Application Priority Data
Apr. 25, 2019    (KR) .................. 10-2019-0048686

(51) Int. Cl.
*H04W 74/0833*    (2024.01)
*H04W 36/08*    (2009.01)
(Continued)

(52) U.S. Cl.
CPC ..... *H04W 74/0841* (2013.01); *H04W 36/087* (2023.05); *H04W 36/302* (2023.05);
(Continued)

(58) Field of Classification Search
CPC ......... H04W 74/0841; H04W 72/0446; H04W 72/046; H04W 72/542; H04W 74/0866;
(Continued)

(56) References Cited

U.S. PATENT DOCUMENTS

2012/0088507 A1* 4/2012 Legg ............. H04W 36/008375
455/436
2018/0279181 A1  9/2018 Hampel et al.
2020/0015132 A1* 1/2020 Liu ..................... H04W 36/385

FOREIGN PATENT DOCUMENTS

CN    107113665    8/2017
CN    108882259    11/2018
(Continued)

OTHER PUBLICATIONS

International Search Report dated Sep. 25, 2020 issued in Application No. PCT/KR2020/003001.
(Continued)

*Primary Examiner* — Justin T Van Roie
(74) *Attorney, Agent, or Firm* — KED & ASSOCIATES, LLP (57) ABSTRACT

The present disclosure provides a new scheme (technology) capable of minimizing a data interruption time occurring at a user equipment (UE) side while enabling a normal access procedure to be performed in connection between the UE and a cell (e.g., a target cell) in a MIMO system.

14 Claims, 6 Drawing Sheets

(51) Int. Cl.
  *H04W 36/30* (2009.01)
  *H04W 72/044* (2023.01)
  *H04W 72/0446* (2023.01)
  *H04W 72/542* (2023.01)
  *H04W 74/08* (2009.01)

(52) U.S. Cl.
  CPC ..... *H04W 72/0446* (2013.01); *H04W 72/046* (2013.01); *H04W 72/542* (2023.01); *H04W 74/0866* (2013.01)

(58) Field of Classification Search
  CPC .............. H04W 36/08; H04W 74/002; H04W 74/0833; H04B 7/063; H04B 7/0695
  See application file for complete search history.

(56) References Cited

FOREIGN PATENT DOCUMENTS

| | | |
|---|---|---|
| KR | 10-2011-0111808 | 10/2011 |
| KR | 10-2012-0035028 | 4/2012 |
| KR | 10-2017-0085428 | 7/2017 |

OTHER PUBLICATIONS

Nokia et al. RACH-less HO in beam-based system. R2-1904291, 3GPP TSG-RAN WG2 Meeting #105bis. Xi'an, China. Mar. 28, 2019. See sections 2-3.
ZTE Corporation et al. Discussion on the RACH-less HO in NR. R2-1904246, 3GPP TSG RAN WG2 Meeting #105bis. Xi'an, China. Mar. 29, 2019. See sections 2-3.
Chinese Office Action dated Sep. 2, 2023 issued in Application No. 202080019402.X.

\* cited by examiner

DEVICE AND METHOD FOR CONTROLLING ACCESS TO CELL

CROSS REFERENCE TO RELATED APPLICATION

This application is a. U.S. National Stage Application under 35 U.S.C. § 371 of PCT Application No. PCT/KR2020/003001, filed Mar. 3, 2020, which claims priority to Korean Patent Application No. 10-2019-0048686 filed on Apr. 25, 2019, which is hereby incorporated by reference in its entirety for all purposes.

BACKGROUND OF THE INVENTION

1. Field of the Invention

The present disclosure relates to a technology for minimizing a data interruption time at a user equipment (UE) side when the UE accesses a cell in a communication system using beamforming technology.

2. Description of the Prior Art

When communication is performed based on beamforming technology on a condition that both a transmission device and a reception device are equipped with a plurality of antennas, there are various technologies in which a gain in transmission capacity can be expected proportional to the number of transmission antennas and the number of reception antennas. A representative technology thereof is multiple-input and multiple-output (MIMO) technology.

In a MIMO technology communication system (hereinafter referred to as a "MIMO system"), transmission/reception devices, which communicate on the basis of beamforming technology, send (transmit/receive) data through an optimal antenna beam with the best signal quality, among the antenna beams in various directions/forms capable of being formed by the transmission device and the reception device.

Meanwhile, when there is a neighboring cell having higher signal quality measured by a user equipment (UE) than a source cell in a mobile communication system due to movement of the UE or the like, a handover technique is performed to cause the UE to access the target cell for switching the access of the UE from the source cell to the target cell.

To briefly describe an existing handover scheme, when handover of the UE to the target cell is determined on the basis of information reported from the UE, the source cell transmits, to the UE, an RRC connection reconfiguration message for performing a target cell-based access procedure.

Upon receiving the RRC connection reconfiguration message, the UE interrupts the source cell-based data transmission operation and performs a target cell-based access procedure, starting with a random access procedure for attempting to access the target cell.

When the target cell-based access procedure is completed, the UE may perform a data transmission operation based on the target cell.

When the existing handover scheme is applied to a MIMO system, it may take a long time for the target cell to receive a random access preamble (random access procedure initiation signal) transmitted through a specific beam of the target cell by the UE by performing RX beam sweeping for receiving the random access preamble based on beamforming technology.

However, the existing handover scheme does not consider the considerable amount of time required for the target cell to receive the random access preamble (random access procedure initiation signal) of the UE.

Therefore, when the existing handover scheme is applied to a MIMO system, a data interruption time, during which the data transmission operation is stopped from the time at which the RRC connection reconfiguration message is received to the time at which the target cell-based access procedure is completed, becomes longer in the UE.

SUMMARY OF THE INVENTION

The present disclosure is directed to providing a technology capable of minimizing a data interruption time at a user equipment (UE) side while enabling a normal access procedure to be performed in connection between the UE and a cell (e.g., a target cell) in a MIMO system.

A cell access control device according to an embodiment of the present disclosure may include: a cell checking unit configured to identify a second cell to which a user equipment (UE), which has accessed a first cell, is to access on the basis of a measurement report received from the UE; a time determination unit configured to determine a transmission time for a specific message to induce an attempt to access the second cell; and a message transmission unit configured to, when the specific message is generated, hold off transmitting the specific message to the UE, and transmit the specific message at the determined transmission time.

Specifically, the specific message may be an RRC connection reconfiguration message that, when received by the UE, causes the UE to stop a data transmission operation based on the first cell and attempt to access the second cell, thereby performing an access procedure.

Specifically, the measurement report may include information on a specific beam having the best signal quality measured by the UE, among a plurality of beams formed in different directions in the second cell, and the time determination unit may be configured to determine the transmission time on the basis of physical random access channel (PRACH) configuration information identified for the second cell and information on the specific beam.

Specifically, the time determination unit may be configured to predict a specific time of receiving an attempt to access the second cell through the specific beam from the UE, on the basis of the PRACH configuration information and the information on the specific beam, and determine the transmission time on the basis of the predicted specific time.

Specifically, the predicted specific time may be a PRACH slot position to which a resource allocated to the specific beam identified from the PRACH configuration information and RACH occasion (RO) previously allocated to the UE are mapped.

Specifically, the time determination unit may be configured to predict a processing time required to process the specific message upon receiving the specific message and transmit a message for an attempt to access the second cell, on the basis of performance information of the UE, and determine a time earlier by the processing time than the predicted specific time to be the transmission time.

Specifically, the message transmission unit may be configured to, when a specific event in which the signal quality of the first cell becomes lower than a threshold is reported from the UE while holding off transmitting the specific message, immediately transmit the specific message irrespective of the transmission time.

A cell access control method according to an embodiment of the present disclosure may include: a cell checking step of identifying a second cell to which a user equipment (UE), which has accessed a first cell, is to access on the basis of a measurement report received from the UE; a time determination step of determining a transmission time for a specific message generated for inducing an attempt to access the second cell on the basis of the measurement report; and a message transmission step of, when the specific message is generated, holding off transmitting the specific message to the UE, and transmitting the specific message at the determined transmission time.

Specifically, the measurement report may include information on a specific beam having the best signal quality measured by the UE, among a plurality of beams formed in different directions in the second cell, and the time determination step may include determining the transmission time on the basis of physical random access channel (PRACH) configuration information identified for the second cell and information on the specific beam.

Specifically, the time determination step may include predicting a specific time of receiving an attempt to access the second cell through the specific beam from the UE, on the basis of the PRACH configuration information and the information on the specific beam, and determining the transmission time on the basis of the predicted specific time.

Specifically, the predicted specific time may be a PRACH slot position to which the resource allocated to the specific beam identified from the PRACH configuration information and RACH occasion (RO) previously allocated to the UE are mapped.

Specifically, the time determination step may include predicting a processing time required to process the specific message upon receiving the specific message and transmit a message for an attempt to access the second cell on the basis of performance information of the UE, and determining a time earlier by the processing time than the predicted specific time to be the transmission time.

Specifically, the message transmission step may include, when a specific event in which the signal quality of the first cell becomes lower than a threshold is reported from the UE while holding off transmitting the specific message, immediately transmitting the specific message irrespective of the transmission time.

According to embodiments of the present disclosure, it is possible to provide the effect of minimizing the data interruption time at the UE side while enabling a normal access procedure to be performed in connection between the UE and a cell (e.g., a target cell) in a MIMO system.

DETAILED DESCRIPTION OF THE EXEMPLARY EMBODIMENTS

Hereinafter, embodiments of the present disclosure will be described with reference to the accompanying drawings.

Figure 1:
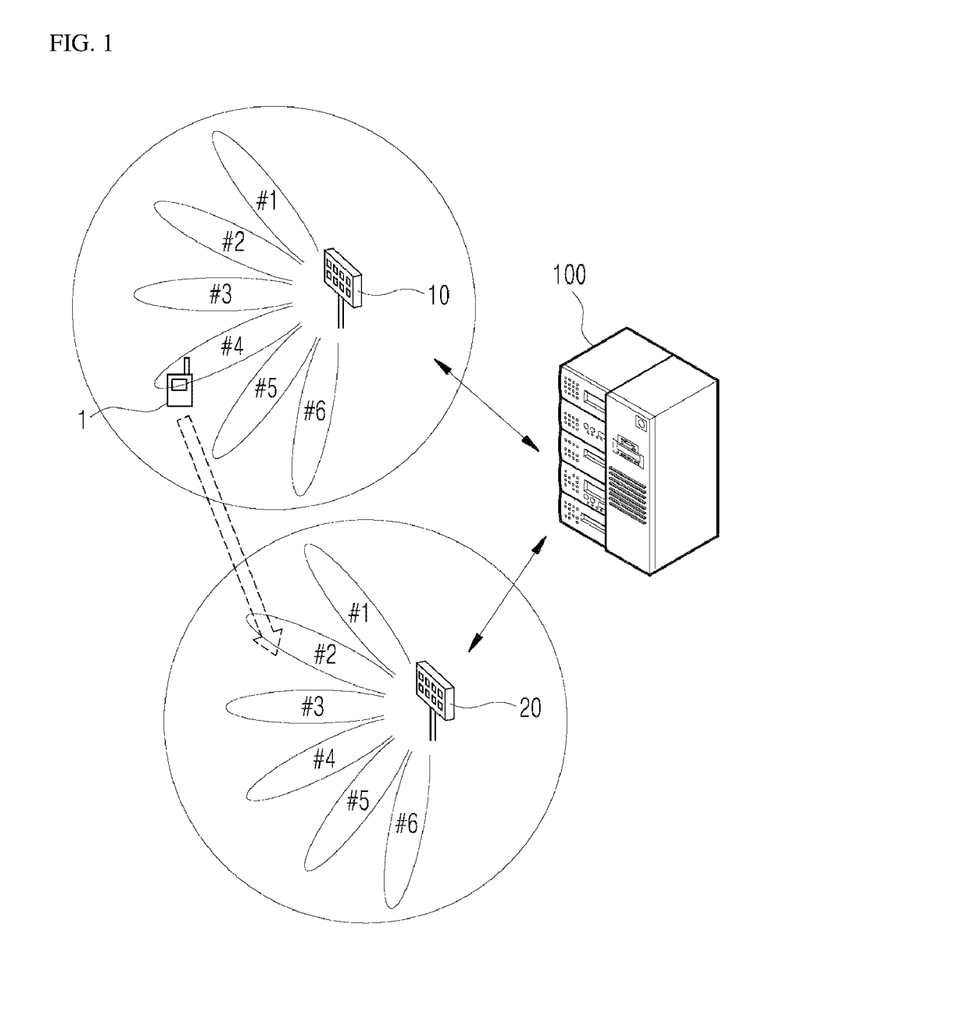
FIG. 1 is a diagram illustrating an example of a communication system environment to which the present disclosure is applied.

FIG. 1 shows a communication system environment to which the present disclosure is applied.

The present disclosure is based on a transmission device being equipped with a plurality of antennas and a reception device being equipped with a plurality of antennas, and is based on multiple-input and multiple-output (MIMO) technology for performing communication based on beamforming technology.

In a MIMO technology communication system (hereinafter referred to as a "MIMO system"), the largest transmission capacity gain is diversity gain and multiplexing gain through beamforming.

To this end, the beamforming technology used in the MIMO system may be classified into digital beamforming, analog beamforming, hybrid beamforming, and the like.

In the case of digital beamforming, the number of formable beams is determined by the number of RF chains.

A plurality of beams formed by digital beamforming may be used as a means to increase the signal quality (signal-to-interference-plus-noise ratio, SINR) by improving the diversity of a receiving end, and may also be used for multiplexing by separating a plurality of receiving ends into different beams to receive different signals, respectively.

A plurality of beams formed by analog beamforming may be used only as a means to increase the signal quality (SINR) by improving the diversity of the receiving end.

The disadvantage of digital beamforming technology wherein installation costs are increased because as many RF chains as the number of antennas are required, and the disadvantage of analog beamforming technology wherein the performance gain is limited, have led to a hybrid beamforming technology in the form of a combination of the two beamforming technologies, which is used in the MIMO system.

In particular, a 5G mobile communication network (hereinafter referred to as a "5G MIMO system") using a high frequency band uses analog beamforming technology (single or hybrid) due to the frequency characteristic of high straightness.

In the MIMO system, transmission/reception devices, which communicate on the basis of beamforming technology, send (transmit/receive) data through an optimal beam with the best signal quality, among the antenna beams in various directions/forms capable of being formed by the transmission device and the antenna beams in various directions/forms capable of being formed by the reception device.

Meanwhile, in a mobile communication system, if there is a neighboring cell having higher signal quality than a source cell, which is measured by a user equipment (UE), due to movement of the UE or the like, a handover technique for switching the connection of the UE from the source cell to the target cell by causing the UE to access the target cell is used.

FIG. 1 shows a handover due to movement of a UE in the MIMO system.

As only an exemplary embodiment, FIG. 1 illustrates a base station form, in which a base station module (e.g., a central unit) and a wireless module (e.g., a distributed unit) are separated and installed at a long distance (hereinafter referred to as a separation type base station), among various forms of base stations.

If a UE 1, which stays in the cell of a wireless module 10, i.e., a DU 10, and uses data services through a base station module 100, i.e., a CU 100, on the basis of the cell of the DU 10, moves to the cell of a DU 20, there may be a time at which the signal quality measured for the cell of the DU 20 becomes better than the signal quality measured for the cell of the DU 10, which is a source cell.

In this case, the CU 100 may cause the UE 1 to access a target cell, i.e., the cell of the DU 20, through a series of signaling operations for handover, thereby switching the connection of the UE 1 from the source cell to the target cell.

Figure 2:
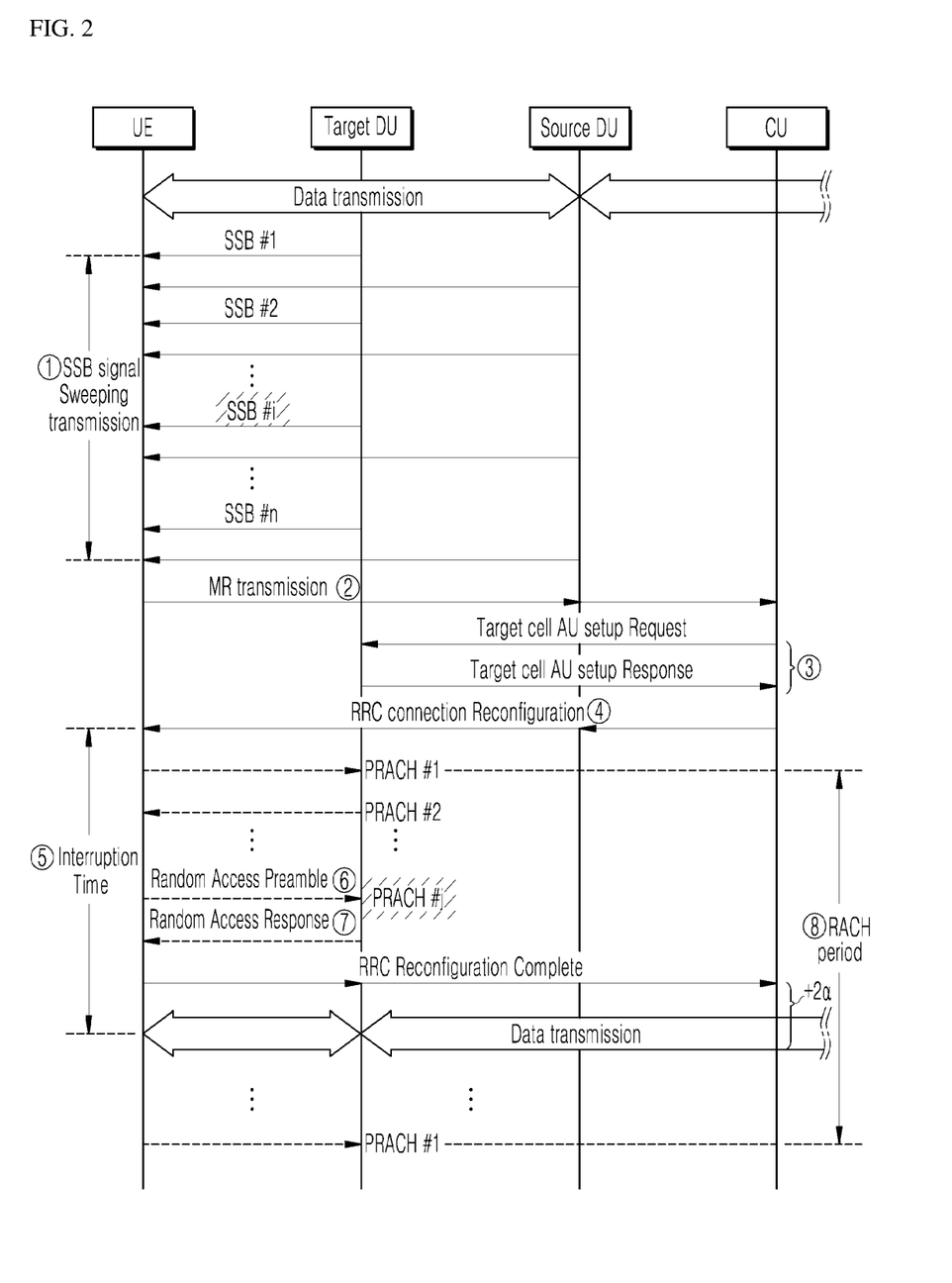
FIG. 2 is a flowchart illustrating an embodiment in which an existing handover scheme is applied to a communication system to which the present disclosure is applied.

FIG. 2 shows an example of applying an existing handover scheme to a MINO communication system.

To briefly describe the existing handover scheme referring to FIG. 2, a UE may use data services through a CU on the basis of a source cell, i.e., the cell of a source DU.

Meanwhile, the respective DUs perform TX beam sweeping for transmitting a specific signal (e.g., SSB, CSI-RS, etc.) including a beam identifier for each of a plurality of beams formed by the DUs on the basis of beamforming technology in the MIMO communication system.

FIG. 2 illustrates a case in which each DU (a source DU or a target DU) performs TX beam sweeping for transmitting SSB signals (SSB #1, #2, . . . #n) including beam identifiers (e.g., SSB Indexes) for each of a plurality of beams formed by the DUs (①).

In addition, the UE measures the received specific signals (e.g., SSB, CSI-RS, etc.), and transmits a measurement report MR for reporting the signal quality (e.g., SINR, RSRP, PSRQ, etc.) of the respective beams of the neighboring cells (②).

In this case, FIG. 2 shows a case in which the signal quality measured for the specific beam, in which the signal SSB #i of the target DU is transmitted, is the best as a result of measuring the signal quality of the respective beams of the neighboring cells (the source DU and the target DU) by the UE.

The CU receives the measurement report MR of the UE through the source DU, and, if there is a neighboring cell having a signal quality equal to or higher than the signal quality of the source DU by a specific value on the basis of the measurement report, determines a handover such that the corresponding neighboring cell becomes a target cell (target DU) of the UE. In addition, the CU may perform a handover preparation procedure through signaling (a target cell AU setup request and a target cell AU setup response) with the target DU (③).

After performing the handover preparation procedure, the CU transmits, to the UE, an RRC connection reconfiguration message for performing the access procedure based on the target cell, i.e., the target DU (④).

Meanwhile, the CU allocates resources (RACH occasions, ROs) capable of transmitting random access preambles for respective UEs in wireless resources (physical random access channels, PRACHs) specified to perform RX beam sweeping for a physical random access channel (PRACH) period predefined for the respective DUs connected thereto.

Accordingly, the UE that has received the RRC connection reconfiguration message stops the data transmission operation based on the source cell, i.e., the source DU and transmits a random access preamble in the RO allocated thereto (⑥) to initiate a random access procedure to attempt to access the target DU, thereby performing the access procedure based on the target DU.

Meanwhile, in the MIMO communication system, each DU performs RX beam sweeping for receiving the random access preamble based on beamforming technology.

Accordingly, as shown in FIG. 2, the target DU, which is the target cell of the current handover, may allocate a plurality of beams to each unit resource in each PRACH slot according to a beam mapping rule on the basis of the physical random access channel (PRACH) configuration defined therein, and may perform RX beam sweeping in units of PRACH slots (PRACH #1, #2, . . . #n).

After receiving the RRC connection reconfiguration message, the UE transmits a random access preamble (random access procedure initiation signal) through a specific beam (e.g., a beam of SSB #i) of the target DU, which is measured to have the best signal quality, in the RO allocated thereto.

Therefore, the target DU may receive the random access preamble in the PRACH slot (e.g., PRACH #j) mapped to the RO of the UE (⑥) while performing the RX beam sweeping in units of PRACH slots (PRACH #1, #2, . . . #n), and may perform the random access procedure through a random access response thereto (⑦) and a series of signaling operations.

Thereafter, the target DU-based access procedure may be performed through a series of signaling operations between the UE, the target DU, and the CU, and if the UE transmits an RRC reconfiguration complete message to the CU through the target DU, the access procedure may be completed so that the UE may use data services through the CU on the basis of the target cell, i.e., the cell of the target DU.

That is, at the UE side, there is a data interruption time during which the data transmission operation is interrupted from the time of receiving the RRC connection reconfiguration message to the time at which the target cell-based access procedure is completed by transmitting the RRC reconfiguration complete message (⑤).

As described above, it takes a long time for the target DU, which is a target cell of handover, to receive the random access preamble (random access procedure initiation signal) transmitted by the UE while performing RX beam sweeping.

In particular, in the case of a 5G MIMO system using analog beamforming technology (single or hybrid), the RACH period (⑧) may be longer, which prolongs the time taken to receive the random access preamble (random access procedure initiation signal) transmitted from the UE.

In addition, as seen in FIG. 2, the data interruption time is the sum of the time between the reception of the RRC connection reconfiguration message and the transmission of the RRC reconfiguration complete message by the UE, and the time of 2α due to a delay (α) between the DU and the CU.

In this case, since the delay (α) between the DU and the CU is negligible, the data interruption time in the UE may be defined as the time between the reception of the RRC connection reconfiguration message and the transmission of the RRC reconfiguration complete message by the UE.

However, the existing handover scheme does not consider the considerable amount of time required for the target cell to receive the random access preamble (random access procedure initiation signal) of the UE, so the data interruption time in which the data transmission operation is stopped in the UE may be prolonged.

Accordingly, the present disclosure proposes a new technology scheme (hereinafter referred to as a cell access control scheme) capable of minimizing the data interruption time at the UE side while enabling a normal access procedure to be performed in connection between the UE and the cell (e.g., the target cell) in the MIMO system.

Specifically, a new cell access control scheme proposed in the present disclosure may be implemented through the cell access control device described below.

Prior to the specific description thereof, the cell access control device of the present disclosure may be implemented in the base station, and more specifically, in the case of a separation type base station, may be implemented in the wireless module (e.g., the DU) or the base station module (e.g., the CU), or may be implemented such that the functions of the cell access control device are distributed to the wireless module (e.g., the DU) and the base station module (e.g., the CU).

Figure 3:
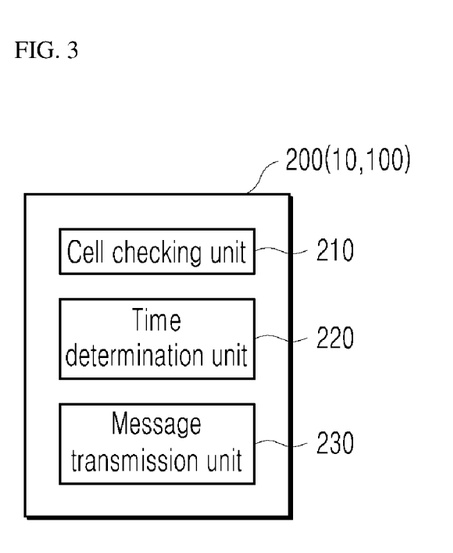
FIG. 3 is a diagram illustrating the configuration of a cell access control device according to an embodiment of the present disclosure.

FIG. 3 shows the configuration of a cell access control device according to an embodiment of the present disclosure.

As shown in FIG. 3, a cell access control device 200 according to an embodiment of the present disclosure may include a cell checking unit 210, a time determination unit 220, and a message transmission unit 230.

All or at least some of the elements of the cell access control device 200 may be implemented in the form of a hardware module, a software module, or a combination of the hardware module and the software module.

Here, the software module may be understood as, for example, instructions executed by the processor that control the operation in the cell access control device 200, and the instructions may be mounted to the memory in the cell access control device 200.

As a result, the cell access control device 200 according to an embodiment of the present disclosure may realize a new cell access control scheme proposed in the present disclosure through the configuration described above.

Hereinafter, respective elements in the cell access control device 200 for realizing the scheme of the present disclosure will be described in more detail.

The cell checking unit 210 may identify a second cell to be accessed by the UE that has accessed a first cell on the basis of the measurement report received from the UE.

The new cell access control scheme proposed in the present disclosure may be applicable to a dual connection technology supporting simultaneous connection to two cells or more, as well as the handover technology described above.

Accordingly, assuming the handover technology, the cell checking unit 210 may identify the second cell, i.e., a target cell, to be accessed by the UE that has accessed the first cell as a source cell on the basis of the measurement report received from the UE.

Alternatively, assuming the dual connection technology, the cell checking unit 210 may identify the second cell, i.e., a secondary cell, to be accessed by the UE that has accessed the first cell as a master cell on the basis of the measurement report received from the UE.

In addition, the new cell access control scheme proposed in the present disclosure may be applicable both to a standalone network structure and a non-standalone network structure.

However, hereinafter, description will be made on the basis of application to the handover technology in the same manner as the description above, for convenience of description.

In the MIMO communication system, the respective DUs may perform TX beam sweeping for transmitting a specific signal (e.g., SSB, CSI-RS, etc.) including a beam identifier for each of a plurality of beams formed by the DUs on the basis of a beamforming technology.

In FIG. 1, each of the DUs 10 and 20 performs TX beam sweeping for transmitting SSB signals (SSB #1, #2, . . . #6) including beam identifiers (e.g., SSB Indexes) for each of a plurality of beams formed by the DUs.

The UE 1 measures respective specific signals (e.g., SSB, CSI-RS, etc.) received from the neighboring cells, and transmits a measurement report MR for reporting the signal quality (e.g., SINR, RSRP, PSRQ, etc.) of the respective beams of the neighboring cells.

The CU 100 receives the measurement report MR of the UE 1 through the source DU (e.g., the cell of the DU 10), and, if there is a neighboring cell having a signal quality equal to or higher than the signal quality of the DU 10 by a specific value on the basis of the measurement report MR (A3 Event), determines a handover such that the corresponding neighboring cell becomes a target cell of the UE 1.

That is, the cell checking unit 210 may identify the target cell, for example, the cell of the DU 20 to which the CU 100 has determined the handover of the UE 1, as described above.

The time determination unit 220 performs the function of determining the transmission time on the basis of the measurement report MR of the UE 1 for the specific message in order to induce an attempt to access the second cell, i.e., the target cell (e.g., the cell of the DU 20).

Here, the specific message may be an RRC connection reconfiguration message that, when received by the UE 1, causes the UE to stop the data transmission operation based on the first cell, for example, the source cell, and to attempt to access the second cell, for example, the target cell, thereby performing the access procedure.

More specifically, if the handover to the target cell (e.g., the cell of the DU 20) for the UE 1 is determined as described above, the CU 100 generates an RRC connection reconfiguration message that enables an attempt to access the target cell (e.g., the DU 20), thereby performing the access procedure.

The time determination unit 220 determines a transmission time of the RRC connection reconfiguration message for the UE 1 generated by the CU 100 as described above on the basis of the measurement report MR of the UE 1.

When the aforementioned specific message is generated, the message transmission unit 230 waits to transmit the message to the UE 1, and then transmits the message to the UE 1 at the transmission time determined by the time determination unit 220.

That is, the message transmission unit 230 waits to transmit the RRC connection reconfiguration message, which is generated for the UE 1 by the CU 100 as described above, until the transmission time determined by the time determination unit 220, and then transmits the RRC connection reconfiguration message to the UE 1 at the transmission time.

Hereinafter, a process of determining the transmission time of the RRC connection reconfiguration message generated for the UE 1 will be described in detail.

Firstly, the measurement report MR transmitted from the UE 1 includes information on a specific beam having the best signal quality (e.g., SINR, RSRP, PSRQ, etc.) measured by the UE 1, among a plurality of beams formed in different directions in the second cell, i.e., the target cell (e.g., the cell of the DU 20).

Specifically, the UE 1 measures respective specific signals (e.g., SSB, CSI-RS, etc.) received from the neighboring cells, and transmits a measurement report MR for reporting the signal quality (e.g., SINR, RSRP, PSRQ, etc.) for each beam of the neighboring cells.

Accordingly, the measurement report MR transmitted from the UE 1 includes the signal quality (e.g., SINR, RSRP, PSRQ, etc.) for each beam of the neighboring cell measured by the UE 1, and also includes information (e.g., an SSB index or SINR/RSRP/PSRQ) on the specific beam having the best signal quality (e.g., SINR, RSRP, PSRQ, etc.) measured.

The time determination unit 220 may determine the transmission time on the basis of the physical random access channel (PRACH) configuration information identified for the second cell, i.e., the target cell of the current handover, and information on the specific beam, i.e., the specific beam of the target cell, identified in the measurement report MR of the UE 1.

To this end, in the present disclosure, the cell access control device 200 is required to be aware of the information of the neighboring cell (e.g., SSB information and PRACH configuration information) based on the first cell (e.g., the DU 10).

According to an embodiment, in the case where all or some functions of the cell access control device 200 are implemented in the DUs 10 and 20, the cell access control device 200 may be aware of the information of the neighboring cell, for example, SSB information and PRACH configuration information, based on the first cell (e.g., the DU 10) by sharing the SSB information and the PRACH configuration information between the DUs (cells).

According to another embodiment, in the case where the cell access control device 200 is implemented in the CU 100, the CU 100 may be aware of the information of the neighboring cell, for example, SSB information and PRACH configuration information, based on the first cell (e.g., the DU 10) by pre-possessing the SSB information and the PRACH configuration information of the respective DUs 10 and 20 connected thereto.

More specifically, the time determination unit 220 may predict the specific time to receive an access attempt from the UE 1 through the specific beam in the second cell, i.e., the DU 20, on the basis of the PRACH configuration information identified for the second cell, i.e., the target cell of the current handover, and the information on the specific beam, i.e., the specific beam of the DU 20, identified in the measurement report MR of the UE 1.

In this case, the predicted specific time may be the PRACH slot position to which the resource allocated to the specific beam identified from PRACH configuration information of the DU 20 and the RACH occasion (RO) previously allocated to the UE 1 are mapped.

For example, if the PRACH configuration information of the target cell, i.e., the DU 20, is identified, the time determination unit 220 may recognize the RACH period, the beam mapping rule, and the structure of the PRACH slot by which the RX beam sweeping is performed in units of PRACH slots (PRACH #1, #2, . . . #n) in the DU 20.

Accordingly, if the UE 1 identifies the information (e.g., an SSB index) on the specific beam of the DU 20 having the best signal quality, the time determination unit 220 may recognize the PRACH slots within the RACH period in which the DU 20 is able to receive the random access preamble through the specific beam.

In this case, the time determination unit 220 may predict, as a specific time S_1, the time of the access attempt, i.e., the time of receiving the random access preamble from the UE 1, that is, the PRACH slot position mapped to the RACH occasion (RO) previously allocated to the UE 1, among the PRACH slots in which the DU 20 is able to receive the random access preamble through the specific beam within the RACH period.

In addition, the time determination unit 220 may determine the transmission time on the basis of the specific time S_1 predicted as described above.

According to an embodiment, the time determination unit 220 may also determine the specific time S_1 predicted as described above to be the transmission time.

According to a more detailed embodiment, apart from predicting the specific time S_1 as described above, when the specific message, i.e., the RRC connection reconfiguration message is received, the time determination unit 220 may predict a processing time S_2 required for processing the RRC connection reconfiguration message and transmitting the random access preamble message to the target cell, i.e., the DU 20, on the basis of performance information of the UE 1.

The CU 100 may possess performance information of the UE through UE capability information transmitted from the UE in the connection process with a new UE.

Accordingly, since the time determination unit 220 is able to identify the performance information of the UE 1 from the CU 100, the time determination unit 220 may predict the processing time S_2 of the UE 1 on the basis thereof.

Accordingly, the time determination unit 220 may determine, as the transmission time, a time earlier by the processing time S_2 of the UE 1 predicted as described above than the specific time S_1 predicted as described above.

The message transmission unit 230 waits to transmit the RRC connection reconfiguration message generated for the UE 1 by the CU 100 until the transmission time determined by predicting the specific time S_1 and the processing time S_2 in the time determination unit 220, and then transmits the RRC connection reconfiguration message to the UE 1.

Figure 4:
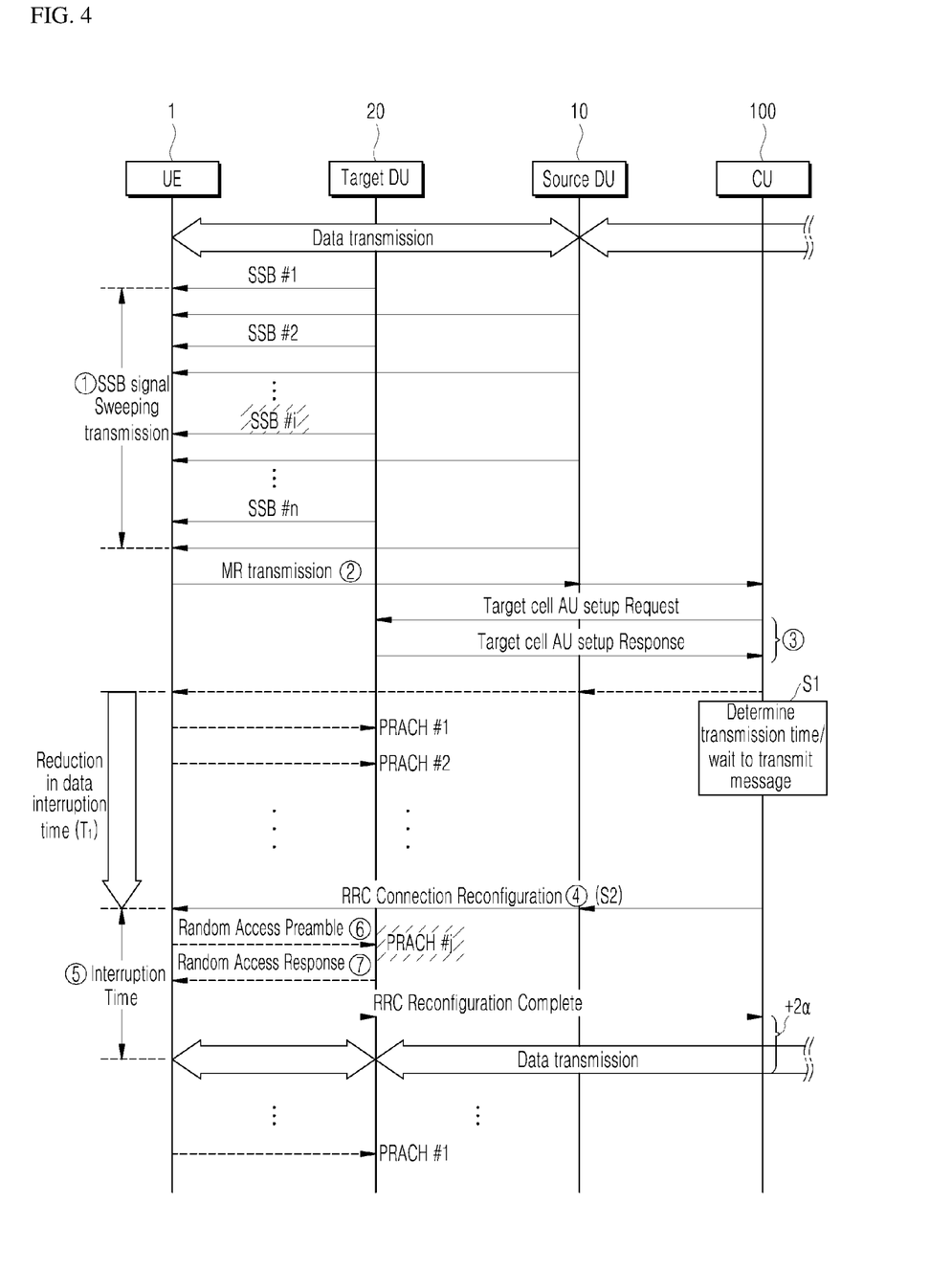
FIG. 4 is a flowchart illustrating an example of applying a cell access control method (scheme) according to an embodiment of the present disclosure.

FIG. 4 shows an example of applying a cell access control scheme according to an embodiment of the present disclosure to a MIMO communication system.

With reference to FIG. 4, the UE 1 may use data services through the CU 100 on the basis of the source cell, i.e., the cell of the source DU 10.

Meanwhile, in the MIMO communication system, the respective DUs (e.g., 10 and 20) perform TX beam sweeping for transmitting a specific signal (e.g., SSB, CSI-RS, etc.), including a beam identifier for each of a plurality of beams formed therein, on the basis of beamforming technology.

FIG. 4 shows that each of the DUs 10 and 20 performs TX beam sweeping for transmitting SSB signals (SSB #1, #2, . . . #n) including a beam identifier (e.g., SSB indexes) for each of a plurality of beams formed therein (①).

In addition, the UE 1 measures the received specific signals (e.g., SSB, CSI-RS, etc.), and transmits a measurement report MR for reporting the signal quality (e.g., SINR, RSRP, PSRQ, etc.) of the respective beams of the neighboring cells (②).

The CU 100 receives the measurement report MR of the UE 1, and, if there is a neighboring cell (e.g., the DU 20) having a signal quality equal to or higher than the signal quality of the source DU 10 by a specific value on the basis of the measurement report (A3 Event), determines a handover such that the corresponding DU 20 becomes a target cell of the UE 1. In addition, the CU 100 may perform a handover preparation procedure through signaling (a target cell AU setup request and a target cell AU setup response) with the target DU 20 (③).

After performing the handover preparation procedure, the CU 100 generates an RRC connection reconfiguration message, which enables the target DU-based access procedure, to be transmitted to the UE 1, determines the transmission time on the basis of the specific time S_1 and the processing time S_2 predicted as described above, and waits to transmit the RRC connection reconfiguration message until the transmission time (S1).

While waiting to transmit the RRC connection reconfiguration message generated to be transmitted to the UE 1, the UE 1 may continue the data transmission operation based on the source DU 10.

Meanwhile, the target DU 20 may allocate a plurality of beams to each unit resource in each PRACH slot according to a beam mapping rule on the basis of the PRACH configuration defined therein, and may perform RX beam sweeping in units of PRACH slots (PRACH #1, #2, . . . #n).

At the transmission time, the CU 100 transmits the RRC connection reconfiguration message, which is waiting to be transmitted, to the UE 1 ((④)), S2).

In this case, since the transmission time is determined in step S1 on the basis of the time of receiving the random access preamble from the UE 1, i.e., the specific time S_1 predicted as the position of the PRACH slot of the target DU 20, which is mapped to the RACH occasion (RO) previously allocated to the UE 1, the transmission time may be a time immediately before the RACH occasion (RO) of the UE 1, or may be a time earlier than but very close thereto.

Meanwhile, although it is illustrated in FIG. 4 that the CU 100 waits to transmit the RRC connection reconfiguration message, the CU 100 may transmit the RRC connection reconfiguration message to the source DU 10 when it is generated, and the source DU 10 may wait to transmit the RRC connection reconfiguration message.

In this case, at the transmission time, the source DU 10 transmits the RRC connection reconfiguration message, which is waiting to be transmitted, to the UE 1.

Accordingly, the UE 1 that has received the RRC connection reconfiguration message may stop the data transmission operation based on the source DU 10, and, shortly thereafter, may transmit the random access preamble in the RO assigned thereto ((⑥)) to initiate a random access procedure of attempting to access the target DU 20, thereby performing an access procedure based on the target DU 20.

The target DU 20 may receive the random access preamble in the PRACH slot (e.g., PRACH #j) mapped to the RO of the UE 1 while performing RX beam sweeping in units of PRACH slots (PRACH #1, #2, . . . #n) ((⑥)), may transmit a random access response thereto ((⑦)), and may perform a random access procedure through a series of signaling operations.

Thereafter, the access procedure based on the target DU 20 may be performed between the UE 1, the target DU 20, and the CU 100 through a series of signaling operations, and if the UE 1 transmits an RRC reconfiguration complete message to the CU 100 through the target DU 20, the access procedure may be completed, so that the UE 1 may use data services through the CU 100 on the basis of the cell of the target DU 20.

The UE 1 has a data interruption time during which the data transmission operation is interrupted from the time of receiving the RRC connection reconfiguration message to the time at which the target cell-based access procedure is completed by transmitting the RRC reconfiguration complete message ((⑤)).

As shown in FIG. 4, according to an embodiment of the present disclosure, the data interruption time in the UE 1 is reduced by the time T1, compared to the prior art in which the RRC connection reconfiguration message is transmitted immediately after it is generated.

As described above, according to an embodiment of the present disclosure, the cell access control scheme is realized such that the transmission time of the RRC connection reconfiguration message transmitted to the UE is adjusted (held) in consideration of the considerable amount of time required for receiving a random access preamble (random access procedure initiation signal) of the UE through RX beam sweeping of the cell in connection between the UE and the cell (e.g., the target cell) in the MIMO system.

Meanwhile, according to a more detailed embodiment, if a specific event (e.g., A2 Event) in which the signal quality of the first cell, i.e., the source cell (e.g., the cell of the DU 10) becomes lower than a threshold is reported from the UE 1 while waiting to transmit the specific message, i.e., the RRC connection reconfiguration message, the message transmission unit 230 may immediately transmit, to the UE 1, the RRC connection reconfiguration message irrespective of the transmission time determined by the time determination unit 220.

An A2 Event is reported/generated in the case where the channel environment between the UE 1 and the source cell (e.g., the cell of the DU 10) deteriorates rapidly.

In the case where the channel environment between the UE 1 and the source cell (e.g., the cell of the DU 10) deteriorates rapidly as described above, if the RRC connection reconfiguration message waits to be transmitted and is then transmitted at the transmission time, the message may not be normally transmitted to the UE 1, and the access procedure may not be normally performed.

Accordingly, in the present disclosure, if the A2 Event indicating that the channel environment between the UE 1 and the source cell (e.g., the cell of the DU 10) is rapidly deteriorating is reported from the UE 1 even while waiting for the transmission of the RRC connection reconfiguration message, the RRC connection reconfiguration message may be immediately transmitted to the UE 1 irrespective of the transmission time, so that the message may be normally transmitted to the UE 1.

Figure 5:
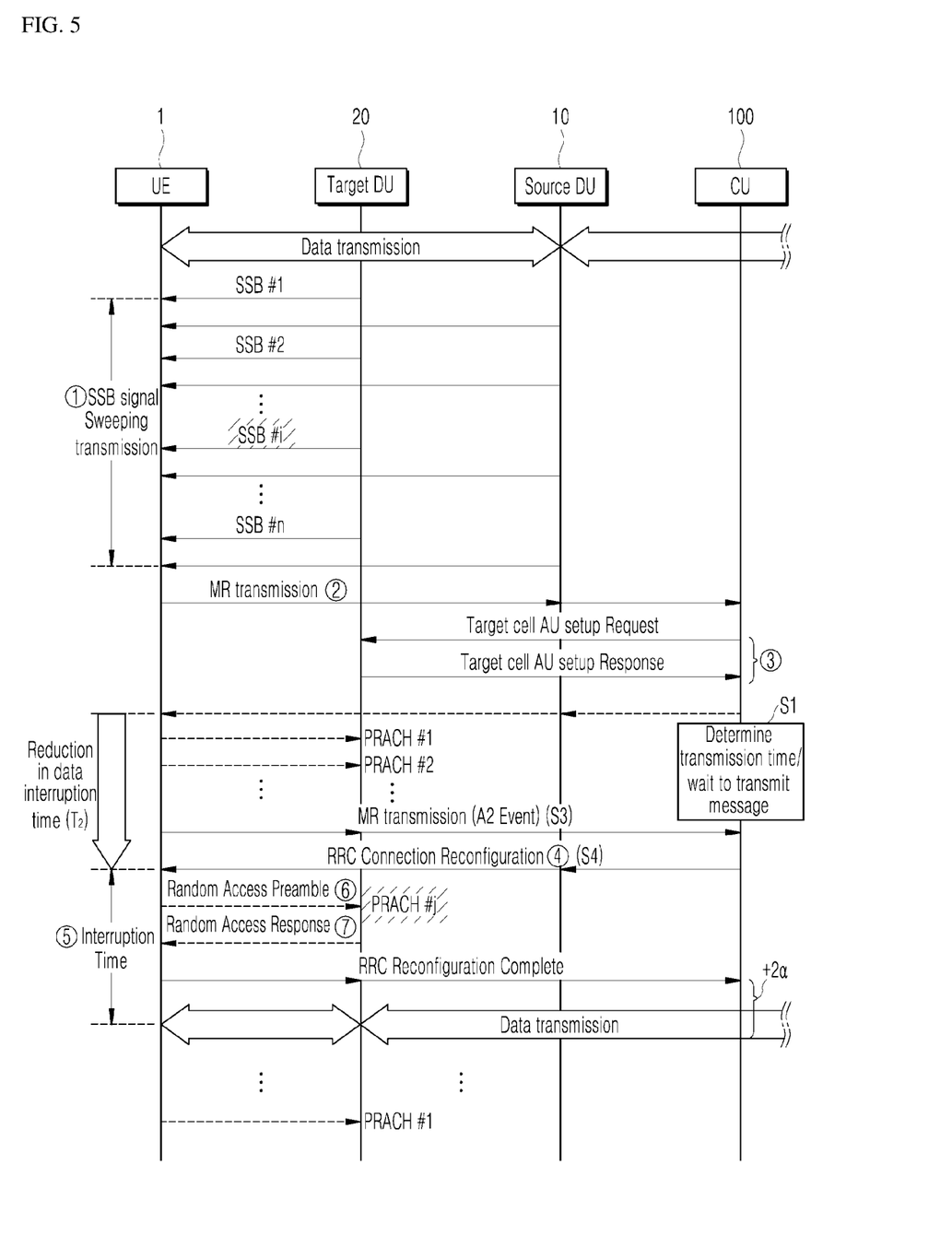
FIG. 5 is a flowchart illustrating an example of applying a cell access control method (scheme) according to another embodiment of the present disclosure.

FIG. 5 shows an example of applying a cell access control scheme according to another embodiment of the present disclosure to a MIMO system.

For simplicity of explanation, descriptions of the SSB signal sweeping ((①)), transmission of the measurement report MR of the UE 1 ((②)), execution of the handover preparation procedure ((③)), determination of the transmission time for the RRC connection reconfiguration message, and waiting therefor (S1), which have been described with respect to FIG. 4, will be omitted.

The UE 1 continues the data transmission operation based on the source DU 10 while waiting for the transmission of the RRC connection reconfiguration message generated to be transmitted to the UE 1.

Meanwhile, the target DU 20 allocates a plurality of beams to each unit resource in each PRACH slot according to the beam mapping rule on the basis of the PRACH configuration defined therein, and may perform RX beam sweeping in units of PRACH slots (PRACH #1, #2, . . . #n).

Meanwhile, the UE 1 repeats the operation of measuring the respective specific signals (e.g., SSB, CSI-RS, etc.) received and transmitting the measurement report MR indicating the signal quality of each beam of the neighboring cell (S3).

If the A2 Event report indicating that the signal quality of the source DU 10 is lower than a threshold is identified on the basis of the measurement report, the CU 100 receiving the measurement report MR of the UE 1 immediately transmits, to the UE 1, the RRC connection reconfiguration message that is waiting to be transmitted, even before the transmission time ((4), S4).

In this case, the transmission time in step S4 may be earlier than the transmission time determined in step S1.

Accordingly, the UE 1 that has received the RRC connection reconfiguration message may stop the data transmission operation based on the source DU 10, and may transmit a random access preamble in the RO allocated thereto ((6)) to initiate a random access procedure to attempt to access the target DU 20, thereby performing the access procedure based on the target DU 20.

The target DU 20 may receive the random access preamble in the PRACH slot (e.g., PRACH #j) mapped to the RO of the UE 1 while performing the RX beam sweeping in units of PRACH slots (PRACH #1, #2, . . . #n) ((6)), may transmit a random access response thereto ((7)), and may perform the random access procedure through a series of signaling operations.

Thereafter, the access procedure based on the target DU 20 may be performed through a series of signaling operations between the UE 1, the target DU 20, and the CU 100, and if the UE 1 transmits an RRC reconfiguration complete message to the CU 100 through the target DU 20, the access procedure may be completed so that the UE 1 may use data services through the CU 100 on the basis of the cell of the target DU 20.

The UE 1 has a data interruption time during which the data transmission operation is interrupted from the time of receiving the RRC connection reconfiguration message to the time at which the target cell-based access procedure is completed by transmitting the RRC reconfiguration complete message ((5)).

As shown in FIG. 5, according to an embodiment of the present disclosure, the data interruption time in the UE 1 is reduced by the time $T_2$ ($<T_1$), compared to the prior art in which the RRC connection reconfiguration message is transmitted immediately after it is generated.

As described above, according to an embodiment of the present disclosure, the cell access control scheme is realized such that the transmission time of the RRC connection reconfiguration message transmitted to the UE is adjusted (held) in consideration of the considerable amount of time required for receiving a random access preamble (random access procedure initiation signal) of the UE through RX beam sweeping of the cell in connection between the UE and the cell (e.g., the target cell) in the MIMO system.

Accordingly, according to an embodiment of the present disclosure, since the data interruption time at the UE side can be reduced by the amount of adjustment in the transmission time of the RRC connection reconfiguration message, it is possible to provide the effect of minimizing the data interruption time.

In particular, according to an embodiment of the present disclosure, the processing time S_2 depending on the performance of the UE is reflected when adjusting the transmission time of the RRC connection reconfiguration message transmitted to the UE, thereby resulting in the effect of enabling a normal access procedure to be performed while minimizing the data interruption time at the UE side.

In addition, according to an embodiment of the present disclosure, if the channel environment between the UE and the source cell deteriorates rapidly while holding the transmission time of the RRC connection reconfiguration message transmitted to the UE, the RRC connection reconfiguration message is immediately transmitted, thereby resulting in the effect of enabling a normal access procedure to be performed while minimizing the data interruption time at the UE side.

Figure 6:
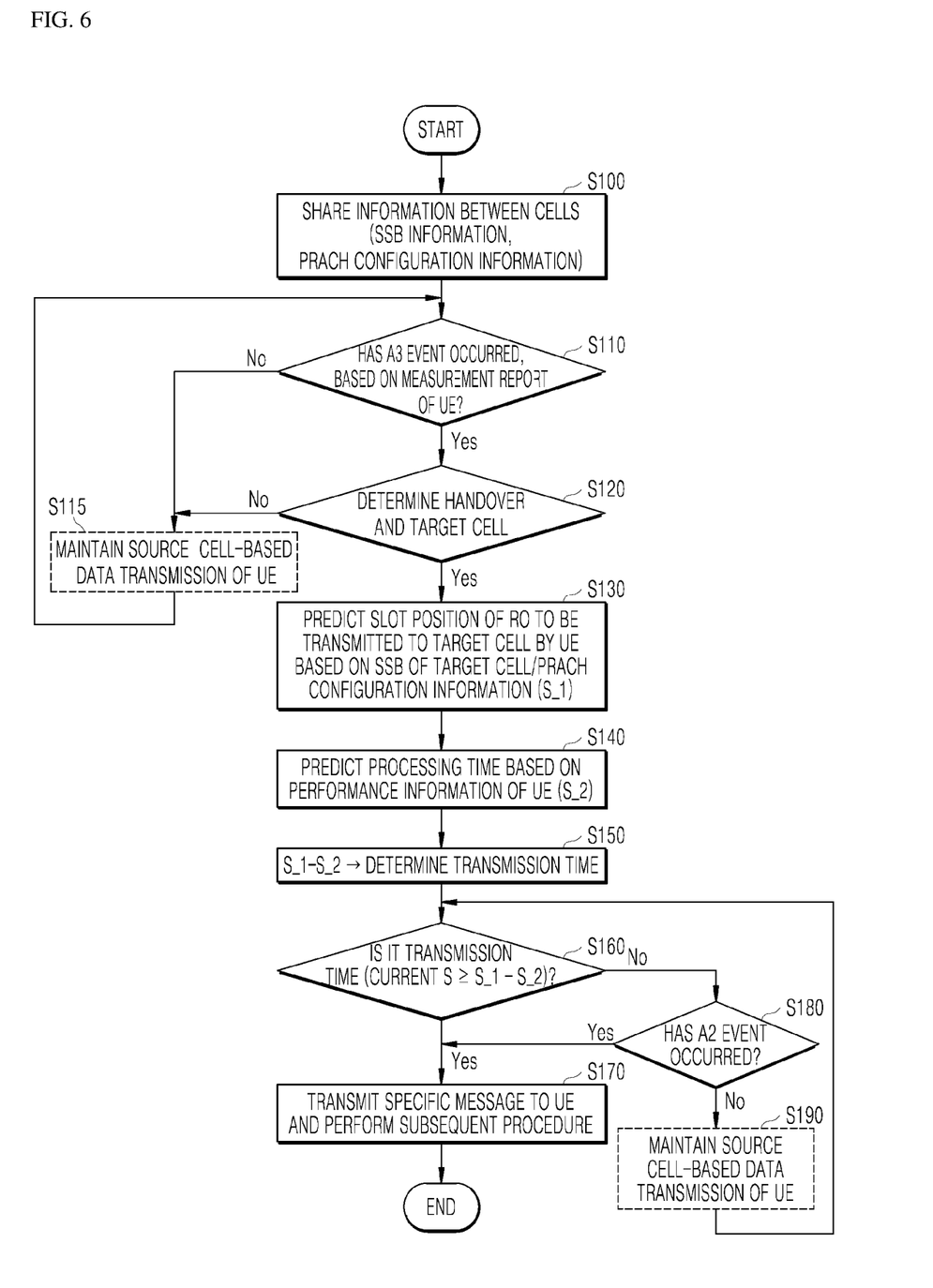
FIG. 6 is a control flowchart illustrating a cell access control method according to an embodiment of the present disclosure.

Hereinafter, a cell access control method according to an embodiment of the present disclosure will be described with reference to FIG. 6.

According to the cell access control method according to an embodiment of the present disclosure, the cell access control device 200 may be aware of information of each cell (e.g., SSB information and PRACH configuration information) by sharing information between the cells or by having information of the respective cells (S100).

Hereinafter, for convenience of description, description will be made on the assumption that handover of the UE is performed.

According to the cell access control method according to an embodiment of the present disclosure, the cell access control device 200 (or the CU 100) determines whether or not an A3 Event indicating that there is a neighboring cell having a signal quality equal to or higher than the signal quality of the source cell (e.g., the DU 10) of the UE by a specific value on the basis of the measurement report MR received from the UE, has occurred (S110).

According to the cell access control method according to an embodiment of the present disclosure, if it is determined that the A3 Event has occurred with respect to the UE 1 ("Yes" in S110), the cell access control device 200 (or the CU 100) determines a handover for the UE 1 and determines a target cell to which the handover is performed on the basis of the measurement report MR (S120).

On the other hand, if no A3 Event has occurred with respect to the UE 1 ("No" in S110), or if it is impossible to determine the target cell to which the handover is to be performed even when an A3 Event has occurred ("No" in S120), the cell access control device 200 (or the CU 100) may not initiate the handover of the UE 1, and the UE 1 may maintain the data transmission based on the source cell, i.e., the DU 10 (S115).

According to the cell access control method according to an embodiment of the present disclosure, if the target cell (e.g., the DU 20) for handover is determined ("Yes" in S120), the cell access control device 200 may predict a specific time for receiving an access attempt from the UE 1 through the specific beam in the second cell, i.e., the DU 20, on the basis of PRACH configuration information identified for the target cell, i.e., the DU 20, and information on the specific beam, i.e., the specific beam of the DU 20, identified in the measurement report MR of the UE 1 (S130).

For example, if the PRACH configuration information of the target cell, i.e., the DU 20, is identified, the cell access control device 200 may recognize the RACH period, the beam mapping rule, and the structure of the PRACH slot by which the RX beam sweeping is performed in units of PRACH slots (PRACH #1, #2, . . . #n) in the DU 20.

Accordingly, if the UE 1 identifies the information (e.g., an SSB index) on the specific beam of the DU 20 having the best signal quality, the cell access control device 200 may recognize the PRACH slots within the RACH period in which the DU 20 is able to receive the random access preamble through the specific beam.

In this case, the cell access control device 200 may predict, as a specific time S_1, the time of an access attempt, i.e., the time of receiving the random access preamble from the UE 1, that is, the PRACH slot position mapped to the RACH occasion (RO) previously allocated to the UE 1, among the PRACH slots in which the DU 20 is able to receive the random access preamble through the specific beam within the RACH period.

In addition, according to the cell access control method according to an embodiment of the present disclosure, when the RRC connection reconfiguration message is received, the cell access control device 200 may predict a processing time S_2 required for processing the RRC connection reconfiguration message and transmitting the random access preamble message to the target cell, i.e., the DU 20 on the basis of the performance information of the UE 1 (S140).

The CU 100 may possess performance information of the UE through UE capability information transmitted from the UE in the connection process with a new UE.

Accordingly, since the cell access control device 200 is able to identify the performance information of the UE 1 from the CU 100, the cell access control device 200 may predict the processing time S_2 of the UE 1 on the basis thereof.

According to the cell access control method according to an embodiment of the present disclosure, the cell access control device 200 may determine, as the transmission time (S_1-S_2), the time earlier by the processing time S_2 of the UE 1 predicted in step S140 as described above than the specific time S_1 predicted in step S130 as described above (S150).

According to the cell access control method according to an embodiment of the present disclosure, the cell access control device 200 waits to transmit the RRC connection reconfiguration message to the UE 1, which is generated by the CU 100 immediately after step S120 in which the target cell (e.g., the DU 20) for handover is determined, until the transmission time determined in step S150, and then transmits the same to the UE 1 thereafter ("Yes" in S160 and S170).

The UE 1 may maintain the data transmission based on the source cell, i.e., the DU 10 while the cell access control device 200 is waiting to transmit the RRC connection reconfiguration message generated to be transmitted to the UE 1 (S190).

Meanwhile, according to the cell access control method according to an embodiment of the present disclosure, if it is determined that an A2 Event occurs to indicate that the channel environment between the UE 1 and the source cell, i.e., the cell of the DU 10, rapidly deteriorates ("Yes" in S180) even before the transmission time determined in step S150 ("No" in S160), the cell access control device 200 immediately transmits the RRC connection reconfiguration message to the UE 1 irrespective of the transmission time (S170).

Then, the UE 1 that has received the RRC connection reconfiguration message may stop the data transmission operation based on the source cell, i.e., the DU 10, and, shortly after that, may transmit the random access preamble in the RO assigned thereto to initiate a random access procedure of attempting to access the target cell, i.e., the DU 20, thereby performing an access procedure based on the target DU 20.

Thereafter, the access procedure based on the DU 20 may be performed between the UE 1, the target cell, i.e., the DU 20, and the CU 100 through a series of signaling operations, and if the UE 1 transmits an RRC reconfiguration complete message to the CU 100 through the DU 20, the access procedure may be completed, so that the UE 1 may use data services through the CU 100 on the basis of the cell of the DU 20.

As described above, according to an embodiment of the present disclosure, a new cell access control scheme may be realized by adjusting the transmission time of the RRC connection reconfiguration message as an optimal time capable of minimizing the data interruption time at the UE side in connection between the UE and the cell (e.g., the target cell) in the MIMO system.

Accordingly, according to an embodiment of the present disclosure, it is possible to provide the effect of minimizing the data interruption time at the UE side while enabling a normal access procedure to be performed in connection between the UE and the cell (e.g., the target cell) in the IMO system.

The cell access control method according to an embodiment of the present disclosure may be implemented in the form of a program command capable of being executed through various computer means, and may be recorded in computer-readable media. The computer-readable media may include program commands, data files, data structures, or combinations thereof. The program commands recorded on the media may be specially designed and configured for the present disclosure, or may be known and available to those skilled in the art of computer software. Examples of the computer-readable recording media include magnetic media such as hard disks, floppy disks, and magnetic tapes, optical media such as CD-ROMs and DVDs, magneto-optical media such as floptical disks, and hardware devices specially configured to store and execute program commands, such as ROM, RAM, flash memory, and the like. Examples of the program commands include high-level language codes capable of being executed by a computer using an interpreter or the like, as well as machine language codes such as those generated by a compiler. The hardware devices described above may be configured to operate as one or more software modules to carry out the operation of the present disclosure, and vice versa.

Although the present disclosure has been described in detail with reference to various embodiments above, the present disclosure is not limited to the above embodiments, and it should be understood that the technical spirit of the present disclosure extends to a range where various changes or modifications can be made by anyone skilled in the art to which the present disclosure pertains without departing from the scope of the present disclosure as claimed in the following claims.

What is claimed is:

1. A device for controlling access to cells, the device comprising:
 a non-transitory memory that stores instructions; and
 a processor that executes the instructions to:
  identify a second cell to which a user equipment (UE), which is accessing a first cell, is to access on a basis of a measurement report received from the UE;
  determine a transmission time for a specific message to induce an attempt by the UE to access the second cell; and
  when the specific message is generated, hold off transmitting the specific message to the UE, and transmit the specific message to the UE at the determined transmission time,
 wherein the measurement report comprises information on a specific beam having a best signal quality measured by the UE among a plurality of beams formed in different directions in the second cell, and
 wherein the processor is configured to determine the transmission time on a basis of physical random access channel (PRACH) configuration information identified for the second cell and information on the specific beam, wherein the processor, when determining the transmission time, is configured to:
predict a specific time that the UE attempts to access the second cell through the specific beam on a basis of the PRACH configuration information and the information on the specific beam; and
determine the transmission time on a basis of the predicted specific time, and
wherein the predicted specific time is a PRACH slot position to which a resource allocated to the specific beam identified from the PRACH configuration information and RACH occasion (RO) allocated to the UE are mapped.

2. The device of claim 1, wherein the specific message is an RRC connection reconfiguration message that causes the UE to stop a data transmission operation on a basis of the first cell and attempt to access the second cell for performing an access procedure.

3. The device of claim 1, wherein the processor, when determining the transmission time, is configured to:
predict a processing time required to process the specific message and transmit a message for an attempt to access the second cell on a basis of performance information of the UE when the specific message is received; and
determine a time earlier by the processing time than the predicted specific time to be the transmission time.

4. The device of claim 1, wherein the processor, after determining the transmission time, is configured to immediately transmit the specific message irrespective of and prior to the transmission time when a specific event of a signal quality of the first cell being lower than a threshold is reported from the UE while holding off transmitting the specific message.

5. The device of claim 1, wherein the device is included in a centralized unit (CU) supporting respective distributive units (DUs) associated with the first and second cells.

6. A method for controlling access to cells, the method comprising:
identifying a second cell to which a user equipment (UE), which is accessing a first cell, is to access on a basis of a measurement report received from the UE;
determining a transmission time for a specific message to induce an attempt to access the second cell; and
holding off transmitting the specific message to the UE when the specific message is generated, and transmitting the specific message at the determined transmission time,
wherein the measurement report comprises information on a specific beam having a best signal quality measured by the UE, among a plurality of beams formed in different directions in the second cell,
wherein the transmission time is determined on a basis of physical random access channel (PRACH) configuration information identified for the second cell and information on the specific beam,
wherein the determining of the transmission time includes:
determining a specific time that the UE attempts to access the second cell through the specific beam on a basis of the PRACH configuration information and the information on the specific beam;
determining a processing time for the UE to process the specific message and to transmit a message for an attempt to access the second cell, on a basis of performance information of the UE when the specific message is received; and
determining a time earlier by the processing time than the specific time to be the transmission time.

7. The method of claim 6, wherein the predicted specific time is a PRACH slot position to which a resource allocated to the specific beam identified from the PRACH configuration information and RACH occasion (RO) allocated to the UE are mapped.

8. The method of claim 6, wherein the transmitting comprises immediately transmitting the specific message irrespective of the transmission time when a specific event of the signal quality of the first cell being lower than a threshold is reported from the UE while holding off transmitting the specific message.

9. A device for controlling access to cells, the device comprising:
a non-transitory memory that stores instructions; and
a processor that executes the instructions to:
identify a second cell to which a user equipment (UE), which is accessing a first cell, is to access based on a measurement report received from the UE;
determine a transmission time for a specific message to induce an attempt to access the second cell;
generate the specific message; and
transmit the specific message,
wherein:
during a time period after generating the specific message and before the determined transmission time, the processor immediately transmits the specific message based on the UE reporting that a signal quality of the first cell is lower than a threshold, and
when the UE does not report that the signal quality of the first cell is lower than the threshold during the time period after the specific message is generated and before the determined transmission time, the processor transmits the specific message at the determined transmission time, and
wherein the device is included in a centralized unit (CU) supporting respective distributive units (DUs) associated with the first and second cells.

10. The device of claim 9, wherein the specific message is an RRC connection reconfiguration message that causes the UE to stop a data transmission operation based on the first cell and attempt to access the second cell for performing an access procedure.

11. The device of claim 9, wherein the measurement report comprises information on a specific beam having a best signal quality measured by the UE among a plurality of beams formed in different directions in the second cell, and
wherein the processor is configured to determine the transmission time based on physical random access channel (PRACH) configuration information identified for the second cell and information on the specific beam.

12. The device of claim 11, wherein the processor, when determining the transmission time, is configured to:
predict a specific time of receiving an attempt to access the second cell through the specific beam from the UE based on the PRACH configuration information and the information on the specific beam; and
determine the transmission time based on the predicted specific time.

13. The device of claim 12, wherein the predicted specific time is a PRACH slot position to which a resource allocated to the specific beam identified from the PRACH configuration information and RACH occasion (RO) allocated to the UE are mapped.

14. The device of claim 12, wherein the processor, when determining the transmission time, is configured to:
- predict a processing time for the UE to process the specific message and transmit a message for an attempt to access the second cell based on performance information of the UE when the specific message is received; and
- determine a time earlier by the processing time than the predicted specific time to be the transmission time.

* * * * *